United States Patent Office 2,840,531
Patented June 24, 1958

2,840,531

SELECTIVE HYDROGENATION CATALYST AND PROCESS FOR PRODUCING SAME

Harold W. Fleming, Louisville, and Ronald E. Reitmeier, Anchorage, Ky., assignors to National Cylinder Gas Company, Chicago, Ill., a corporation of Delaware No Drawing. Application December 9, 1954
Serial No. 474,296

9 Claims. (Cl. 252—455)

This invention relates generally to hydrogenation of unsaturated hydrocarbons and especially to the selective hydrogenation of acetylenic hydrocarbons in gas mixtures containing olefins, hydrogen and other constituents. More specifically, the invention involves an improved nickel-chrome catalyst for such reactions and the process for producing the catalyst.

Because of the relative instability of their triple bond, acetylenic hydrocarbons may be hydrogenated more readily than hydrocarbons containing double bonds, and selective hydrogenation of acetylene in a gas mixture containing olefins is possible by utilization of a catalyst of appriate activity to cause the hydrogenation of acetylene to occur at a much greater rate than the hydrogenation of the olefins. However, the problem is rendered much more complex when only small amounts of acetylene are present in the gas mixture and when it is necessary to completely hydrogenate the acetylene without appreciably lowering the olefin content in order to produce a gas mixture suitable for use as a synthesis intermediate. By way of example, gas mixtures consisting essentially of olefins and hydrogen for the production of polyethylene in general should not contain more than about 25 parts of acetylene per million parts of the mixture. Mixtures containing higher acetylene concentrations have been found to be unsuitable for the polymerization reaction.

An important object of this invention is to provide a catalyst which is capable of hydrogenating small amounts of acetylenes in gas mixtures in such manner that the reaction proceeds virtually to completion at a high velocity to reduce the acetylenes content to a few parts per million, and, since any olefins which are hydrogenated in a gas mixture containing same are effectively lost, a related object is to provide an acetylene hydrogenation catalyst which is relatively inactive in promoting hydrogenation of olefins even in mixtures containing a major proportion of olefins.

Another object is to provide a catalyst which may be readily regenerated after continued use has rendered it inactive due to polymer deposition and which upon regeneration by burning off the polymer is restored virtually to its original activity with its physical properties unimpaired.

Another important object is to provide a catalyst which has a relatively long effective life, good resistance to thermal shock, high mechanical strength even after long use, and resistance to the effects of poisons such as carbon monoxide which are usually present in hydrocarbon mixtures derived from petroleum.

Nickel-chrome catalysts have been known to be effective hydrogenation catalysts for some time and in some instances have even been suggested as appropriate for selective hydrogenation reactions. The prior catalysts, however, have generally exhibited too great activity for the hydrogenation of olefins and resort to such means as sulfiding to reduce the activity has had to be utilized in order to render them sufficiently inactive to be selective. Sulfiding, however, is very difficult to control with the result that it is almost impossible to establish just the proper degree of activity, particularly uniformly throughout a large size bed of catalyst. Either or both excessive acetylene leakage and excessive olefin hydrogenation with accompanying local overheating is likely to occur if the degree of sulfiding throughout the bed is not uniform. Moreover, the presence of sulfur compounds in the stream of gas being treated to effect acetylene removal is quite troublesome, because variations in the degree of sulfiding will occur in response to variations of the sulfur in the gas stream. If sulfur free gas is supplied to a sulfided catalyst bed, sulfur may be added to the gas stream and additional purification steps may be required to remove it. Another difficulty is that the customary regeneration operations which must be carried out from time to time almost always cause variations in the degree of sulfiding with the result that the regenerated catalyst does not have the same relative activity for the olefin and acetylene hydrogenation reactions after regeneration as it originally had.

We have discovered that a superior selective catalyst may be readily formed without sulfiding by utilizing a nickel-chrome oxide mixture having a large proportion of the oxide of trivalent chromium supported upon appropriate carrier materials. Selectivity depends not only upon the composition of the catalytically active material but also upon the composition and relative amount of carrier material present. Moreover, certain carrier materials have been found to be especially suitable in that they will withstand the rigorous regeneration procedure to which the catalyst must be subjected every few weeks without loss of mechanical strength or impairment of catalytic activity or selectivity. Other closely similar carriers have been found to be unsatisfactory in this respect.

The catalytically active material of the catalyst of this invention consists of intimately mixed oxides of nickel and chromium which preferably are prepared by calcining a nickel salt with chromic anhydride ($CrO_3$) to convert the salt to nickel oxide and to reduce the chromic anhydride or chromium trioxide to lower valence oxide forms such as chromic oxide ($Cr_2O_3$). In this connection, we have discovered that the resulting catalyst will not be selective in the event that more than one percent of the catalytically active material after calcination is chromium with a valence greater than three (determined as hexavalent chromium). In such event the resulting catalyst will be entirely too active in promoting the hydrogenation of olefins. This is in distinct contrast to the teachings of earlier investigators such as Lazier, who in Patent 1,746,782 indicated that fully reduced trivalent chromium oxide obtained by high temperature calcination of metal chromates had higher activity than forms thereof which were not fully reduced. It is not understood why the amount of hexavalent chromium in the mixed oxides is critical. The catalyst of this invention is reduced with hydrogen to activate it, preferably after it has been charged into the catalytic reactor, and this hydrogen reduction treatment is believed to convert all the remaining hexavalent chromium to a lower valence form. Since it is normally expected that all the hexavalent chromium is ultimately reduced before the catalyst is effective for use, it is not understood why the degree of reduction effected in the calcination step should be signficant. Repeated tests have proved that it is, however, as will be shown more fully by the specific examples set forth herein.

Although the catalytically active material has been described herein as a mixture of oxides of nickel and chromium, it is to be understood that the exact chemical nature of the catalytic material is not known. It may be a mixture of oxides, or it may be a compound formed between nickel and chromium oxides or a mixture of the two or other types of compounds or mixtures thereof.

The relative amounts of nickel oxide and chromium oxide are not believed to be critical, particularly since adjustment of activity and selectivity can be readily accomplished by varying the proportions of active material and carrier. In any event, however, the mol ratio of chromium to nickel should not be less than 1 to 1. The preferred mol ratio is about 15 to 1 and the maximum is believed to be about 30 to 1. When ratios greater than about 15 to 1 are employed it is believed that the excess chromic oxide ($Cr_2O_3$) acts more as a carrier than as a catalytically active material.

The relative amounts of active material and carrier may of course also be varied over a range, and in certain instances it has proved necessary to do so in order to achieve the desired selectivity and activity. In general, however, the weight percentage of active material to total catalyst mass should be within the range of about 2% to about 15% depending upon the nickel to chrome ratio in the catalyst mass, the composition of the carrier, the composition of the gas stream to be treated and the degree of acetylene removal desired. But in any event the maximum nickel content of the catalyst should not be in excess of 1% by weight.

The composition of the carrier material is very important because of the extremely rigorous treatment to which catalysts of this type are subjected. After beds of such catalyst have been in use two or three weeks polymer deposits are formed upon the surface which render the catalyst ineffective. These deposits are burned off of the catalyst by passing steam through the bed at a temperature of about 750° F., and within the bed the temperature may rise as high as 1200° F. due to the heat generated by oxidation of the polymer. Of necessity considerable thermal shock to the catalyst occurs during the two or three day period required for regeneration. Following the steaming treatment the catalyst must be reduced with hydrogen at a high temperature, and then the temperature is lowered to the operating range of about 400° F. Few carrier materials will withstand such regeneration treatment without physical or chemical breakdown, and this treatment must be repeated every two or three weeks during the life of the catalyst, which must be at least one to three years if the catalyst is to be suitable for commercial use.

Two types of carriers have been found to be satisfactory. The preferred type is a mixture of clay and hydraulic cement with or without alumina. Various clays such as kaolin, ball clay and certain refractory clays may be used, and various hydraulic cements such as Portland type cements and aluminous cements are satisfactory. In this preferred carrier low grade alumina may be used. The second carrier which has proved satisfactory consists essentially of high grade alumina which contains less than 0.05% sodium reported on an $Na_2O$ basis. For some reason unknown to us, low grade alumina which is quite suitable in the first described carrier is not suitable when utilized alone as a carrier because the catalyst will not withstand regeneration without deteriorating. However, high grade alumina utilized alone is suitable.

While the second carrier above referred to preferably consists of alumina without diluent, the composition of the first carrier above referred to, comprising a mixture of hydraulic cement and clay with or without alumina, may be varied to some extent and still produce a quite satisfactory catalyst. The amount of cement in this last mentioned carrier may be varied from about 20% to about 90% of the weight of the carrier, and the amount of clay may be varied from about 10% to about 50% of the weight of the carrier, while the amount of alumina in the carrier may vary from 0 to about 60%, and if desired other materials such as magnesite or talc may be added as substitutes for, or in addition to, the alumina.

Certain of the following specific examples further illustrate the improved catalysts of our invention and the novel processes by which they are produced.

*Example 1*

The following materials were mixed thoroughly with about 300 parts of water to facilitate mixing:

| | Parts by weight |
|---|---|
| Nickel nitrate—$Ni(NO_3)_2.6H_2O$ | 28 |
| Nickel carbonate—$NiCO_3$ | 18 |
| Chromic acid anhydride—$CrO_3$ | 308 |

The mixture was placed in an oven and calcined in air at a temperature of 1100° F. for a period of sixteen hours. The calcined material was then ground to such fineness that it passed through a forty mesh screen. Analysis of the ground material indicated that the hexavalent chromium content of the calcined mixture was about 0.13%.

The analytical method for determining hexavalent chromium involved boiling the solid sample for three hours with sodium carbonate solution, acidification of said solution with potassium bisulfate and boiling for five minutes, further acidification of the solution with phosphoric and sulfuric acids, addition of potassium iodide, and titration of the liberated iodine by sodium thiosulfate solution. The percentage of hexavalent chromium in the solid catalytically active material was calculated by the following formula:

$$\text{Percent hexavalent chromium} = \frac{1.734 \text{ (ml. of thiosulfate)(normality of thiosulfate)}}{\text{g. of sample}}$$

This method was also used in determining the hexavalent chromium content of the calcined oxides utilized in the catalysts of Examples 2 through 5.

The ground oxides comprising the catalytically active material were incorporated in a carrier by intimately mixing with the following materials:

| | Parts by weight |
|---|---|
| Ground oxides | 5 |
| Alumina (hydrated) | 45 |
| Clay (Kentucky ball) | 20 |
| Portland cement | 30 |

Sufficient water was added during mixing (about 100 parts) to form a semi-plastic mass which was allowed to stand until it became partially dry. The partially dried material was then passed through a twenty mesh screen and pelleted with the addition of 3% graphite as a lubricant into one-quarter inch diameter pellets in a Stokes pelleting machine. The pellets were then allowed to cure.

A charge of this catalyst was placed in an isothermic reactor and was reduced for eight hours by passage of hydrogen gas at a temperature of 750° F. through the charge. The temperature of the charge was then reduced to 400° F. and a gas of the following composition was passed through the catalyst bed.

| Component: | Mole percent |
|---|---|
| Butene-1 | 0.5 |
| Acetylene | 0.7 |
| Butadiene | 1.5 |
| Propylene | 12 |
| Ethylene | 26 |
| Hydrogen | 18 |
| Methane | 41.3 |

This gas was passed through the catalyst bed at a pressure of 40 p. s. i. g., a temperature of 400° F. and a space velocity of 500 computed on a dry gas basis at 60° F. and at 14.7 p. s. i. g. The gas emerging from the catalyst bed was analyzed and found to have an average acetylene content of about ten parts per million. The average amount of olefin hydrogenated was found to be less than one percent of the total olefins present. Thus it will be seen that this catalyst is not only very active for the hydrogenation of the acetylene, almost completely eliminating same, but also that this catalyst is selective since the amount of olefins lost by hydrogenation is extremely low. Accordingly, this catalyst is exceptionally well suited for the selective hydrogenation of acetylenic compounds in the presence of olefins.

Example 2

A catalyst was prepared exactly as in the foregoing example with the exception that the initial calcination of the mixed nickel salts and chromic anhydride was carried out at a temperature of only 650° F. for a period of sixteen hours. The calcined mixed oxides were analyzed and found to have a hexavalent chromium content of 23.2%.

This catalyst was reduced with hydrogen and utilized in the same manner as the catalyst of Example 1 in conjunction with the same gas mixture. It was found upon analysis of the emerging gas stream that although the acetylene was completely hydrogenated, the activity of the catalyst for the olefin hydrogenation reaction was such that 18.5% of the olefins in the gas stream were hydrogenated and effectively lost. Thus this catalyst although highly active is not selective and is unsuitable for the selective hydrogenation reaction.

Example 3

A catalyst was prepared exactly as in Example 1 except that the mixture of nickel salts and chromic anhydride was calcined for sixteen hours at 850° F. Analysis of the calcined oxides indicated that the hexavalent chromium concentration in percent by weight of the total oxides was 0.7%.

A gas of the composition set forth in Example 1 was passed through a bed of the catalyst which had been reduced with hydrogen, as in Example 1, under the same conditions of temperature, pressure and space velocity. This catalyst was found to effectively reduce the acetylene content of the emergent gas stream to about 15 parts per million and none of the olefins in the gas were hydrogenated. Thus this catalyst is very effective for the selective hydrogenation reaction.

Example 4

A catalyst was prepared exactly as in the Example 1 except that the nickel salt, chromic anhydride mixture was calcined for seventeen hours at a temperature of 820° F. Analysis of the calcined mixture showed that it contained 1.6% hexavalent chromium.

This catalyst was charged in the same reactor utilized in Example 1, was reduced with hydrogen as in that example, and an identical gas mixture was passed through the reactor. Analysis of the emergent gas indicated that all the acetylene was hydrogenated but that the olefins also were hydrogenated to an excessive degree. On the average about 20% of the olefins were lost. Thus this catalyst is not selective and is not suitable for the removal of acetylene from gas stream containing olefins.

The following table summarizes the foregoing examples and shows the effect of the hexavalent chromium content of the calcined oxides upon the degree of selectivity of the catalysts formed from the oxides.

| Example | Hexavalent Cr Content of Oxides Percent | Acetylene Content of Emerging Gas, p.p.m. | Relative Amount of Total Olefins Hydrogenated |
|---|---|---|---|
| 1 | 0.13 | 10 | less than 1%. |
| 2 | 23.2 | none | 18.5%. |
| 3 | 0.7 | 15 | none. |
| 4 | 1.6 | none | 20.5%. |

From the foregoing table it will be readily apparent that in order to achieve selectivity, the calcined oxides must not contain more than about 1% hexavalent chromium. When this value is exceeded the catalyst is much too active in the hydrogenation of olefins, and, accordingly, the catalyst is not selective. On the other hand, when the hexavalent chromium content is slightly below 1% of the calcined oxide mixture, the catalyst is selective and at the same time has adequate activity for the hydrogenation of acetylene.

Example 5

A catalyst was prepared from an oxide mixture similar to that disclosed in Example 1 which had been calcined at 1100° F. for sufficient time to convert virtually all of the chromic acid anhydride to the lower oxide form. The degree of calcination was such that less than one percent hexavalent chromium remained. The resulting calcined oxides were crushed and granulated, and 4 parts by weight of the granulated material were thoroughly mixed with 93.6 parts of low grade alumina, about 3 parts of graphite being added to render the material suitable for tabletting. The oxide and carrier mixture was tabletted and the formed tablets were calcined for a short time at a temperature of 800° F.

This material was placed in a catalytic reaction vessel and reduced with hydrogen similarly to the catalyst in Example 1. A gas having a composition similar to that set forth in Example 1 was passed through the reduced catalyst bed at a temperature of about 400° F. and the emerging gas stream was analyzed and found to have a very low acetylene content indicating suitable catalytic activity. Moreover, the emergent gas stream contained virtually the same proportion of olefins as the feed stream indicating that the catalyst was properly selective.

After the catalyst had been used in this manner a few weeks it became inactive due to polymer deposition, and it became necessary to reactivate the catalyst by passing steam at a temperature in excess of 700° F. through the bed for about twelve hours. The catalyst was then reduced with hydrogen as in Example 1. This regeneration process was found to effectively revive the catalyst, but after the catalyst had been regenerated several times in this manner, at intervals of two or three weeks between regenerations, it was found that the catalyst had deteriorated to such extent that the pellets could be readily crushed beween the fingers. Moreover, in the bed of catalyst powdering and disintegration of the pellets had occurred to such extent that the effectiveness of the bed was greatly reduced due to blockage of the interstices and channeling. Accordingly, the catalyst of this example is not satisfactory for commercial operations.

Example 6

In order to determine more accurately the resistance of a catalyst prepared with a carrier material consisting of low grade alumina, such as the catalyst of Example 5, to high temperature steaming and thermal shock in regard to mechanical strength, ¼ inch pellets were prepared utilizing low grade hydrated alumina and 3% graphite. This alumina had approximately the following analysis:

| | Percent |
|---|---|
| $Al_2O_3$ | 64.8 |
| $SiO_2$ | 0.01 |
| $Fe_2O_3$ | 0.009 |
| $TiO_2$ | 0.004 |
| $Na_2O$ | 0.33 |
| Insolubles | 0.02 |

The uncalcined pellets exhibited an average crush strength of 175 pounds dead weight load. After six hours of calcination at 850° F. the pellets had an average crush strength of 236 pounds dead weight load. After steaming of the calcined pellets for 20 hours at 1100° F. an average crush strength of 180 pounds dead weight load was obtained. After 40 hours of steaming at 1100° F. the pellets were too soft for crush strength determinations.

Example 7

One quarter inch pellets similar to those of the previous example were prepared except that high grade, low sodium, hydrated alumina was used instead of the low grade alumina of that example. This alumina had the following impurities content:

| | Percent |
|---|---|
| SiO$_2$ | 0.5 |
| Fe$_2$O$_3$ | 0.1 |
| Na$_2$O | 0.04 |
| CaO | 0.2 |
| SO$_3$ | 0.46 |

The crush strength of the uncalcined pellets averaged 357 pounds dead weight load. After calcination at 850° F. for six hours the pellets exhibited an average crush strength of 538 pounds dead weight load. After steaming for 120 hours at 850° F. the pellets possessed an average crush strength of 446 pounds on the same basis. After 120 additional hours of steaming at 1100° F. the pellets had an average crush strength of 473 pounds dead weight load, and after the 240 hours of steaming, the pellets were hard and shiny and could not be broken by hand.

From Examples 5, 6 and 7 it will be seen that catalyst compositions in which the active material is supported upon high grade, low sodium content, hydrated alumina are far superior to compositions made from low grade alumina. As stated previously, we do not understand the reason for this phenomenon. It is believed that the sodium content of the lower grade material may be responsible for the loss of strength of the pellets upon regeneration, for this impurity is known to be an accelerator for alumina crystal transformation from one phase to another and such transformation may be expected to weaken the carrier. On the other hand, it may be that some other difference between the two materials, such as the higher iron and silica contents of the high grade alumina, is responsible. Other high grade alumina materials have given comparable results to those reported in Example 7. One such material contains the following impurities:

| | Percent |
|---|---|
| SiO$_2$ | 0.4 |
| Fe$_2$O$_3$ | 0.1 |
| Na$_2$O | 0.04 |
| CaO | 0.08 |
| MgO | 0.06 |
| SO$_3$ | 1.35 |

From the foregoing table it will be noted that this material has a very low sodium content and higher silica and iron contents than the low grade alumina. The differences in the impurities contained in low grade and high grade alumina very probably reflect the differences in the manufacturing processes for making the two materials.

Although hydrated alumina has been utilized in the foregoing examples, previously calcined or dehydrated alumina is also suitable, and the term alumina as used herein and in the claims is meant to include all the forms of aluminum oxide and hydrates thereof.

*Example 8*

A catalyst prepared in accordance with Example 1 and utilizing carrier composition of cement, clay and alumina, as described in that example, was subjected to repeated periods of use and regeneration similar to those set forth in Example 5. An examination of this catalyst after many cycles of use and regeneration indicated that its mechanical properties were unimpaired by the vigorous steaming treatment and that it behaved quite similarly to the high grade alumina of Example 7.

*Example 9*

A catalyst was prepared in accordance with Example 1 utilizing a carrier composition of cement, clay and low grade alumina as described in that example except that the semi-plastic material formed upon the addition of water was extruded into ¼ inch extrusions which were allowed to cure. In order to determine the catalyst's mechanical strength, the crush strength as expressed in pounds dead weight load was tested before calcination, after calcination and after steaming. The average crush strength of the catalyst before calcination was 322 pounds dead weight load. After 6 hours of calcination at 850° F. the average crush strength expressed as pounds dead weight load was 347. After 144 hours of steaming at 850° F. the crush strength expressed on the same basis was 245 pounds.

Another batch of catalyst, prepared in the same manner as the catalyst described above except that 2.5% of the nickel-chromium oxides was compounded with the carrier and extruded into ¼ inch cylinders, exhibited an average crush strength of 234 pounds dead weight load after 288 hours of steaming at 850° F. Both of these extruded catalysts remained in good condition after the steaming. They were hard and gave no evidence of dusting. From the foregoing examples it will be seen that either high grade alumina or a mixture of hydraulic cement, clay and low grade alumina may be utilized as the carrier material in our catalyst and the catalytic bodies may be formed by either tabletting or extrusion, and equally good results will be achieved. The catalyst pellets of the foregoing examples were generally cylindrical in shape, however, the catalysts of this invention may be made in any other conventional shape such as saddles or Rashig rings if desired.

The novel process of this invention, involving the steps of mixing relatively large amounts of compounds containing hexavalent chromium with lesser amounts of compounds containing nickel, and calcining the resultant mixture to convert substantially all of the hexavalent chromium to the trivalent form in order to achieve selectivity in the finished catalyst, followed by admixture of the calcined oxides with a suitable carrier material, is fully set forth in the foregoing examples, particularly Example 1. It will be appreciated, however, that various changes in this process may be made without departing from the spirit of this invention. For example, nickel chromate (NiCrO$_4$) may be used as a starting material instead of a mixture of nickel salts and chromic anhydride or other nickel compounds than those specifically mentioned may be employed. Moreover, the composition of the carrier material may be varied considerably within the ranges described herein. Also, various changes and modifications in the catalyst per se, such as will present themselves to those familiar with the art, may be made without departing from the spirit of this invention.

We claim:

1. A nickel-chrome catalyst suitable upon reduction for the selective hydrogenation of acetylenic compounds in the presence of olefins and exhibiting excellent resistance to high temperature steaming, said catalyst comprising a calcined mixture of nickel oxide and chromic oxide supported upon a carrier, the amount of nickel in the catalyst being less than one percent by weight, the calcined mixture of oxides containing hexavalent chromium in an amount less than one percent by weight of the mixture, the calcined mixture of oxides constituting between about 2% and about 15% by weight of the catalyst, and said carrier being selected from the group consisting of: (1) high grade alumina containing less than 0.05% sodium on a Na$_2$O basis and (2) carrier mixtures comprising at least 20% hydraulic cement and at least 10% clay.

2. A nickel-chrome catalyst suitable upon reduction for the selective hydrogenation of acetylenic compounds in the presence of olefins and exhibiting excellent resistance to high temperature steaming, said catalyst comprising a calcined mixture of nickel oxide and chromic oxide supported upon a carrier, the amount of nickel in the catalyst being less than one percent by weight, the calcined mixture of oxides containing hexavalent chromium in an amount less than one percent by weight of the mixture, the calcined mixture of oxides constituting between about 2% and about 15% by weight of the catalyst, and said carrier having such composition that at least 20% thereof is hydraulic cement and at least 10% thereof is clay.

3. The catalyst of claim 2, the mixed nickel and chromic oxides constituting about 4% to about 6% by weight of the catalyst.

4. The catalyst of claim 3, the carrier including about 40% to about 50% alumina in addition to the cement and clay, the amount of hydraulic cement being about 25% to about 35% and the amount of clay being about 15% to about 25% of the carrier.

5. A nickel-chrome catalyst suitable upon reduction for the selective hydrogenation of acetylenic compounds in the presence of olefins and exhibiting excellent resistance to high temperature steaming, said catalyst comprising a calcined mixture of nickel oxide and chromic oxide supported upon a carrier, the amount of nickel in the catalyst being less than one percent by weight, the calcined mixture of oxides containing hexavalent chromium in an amount less than one percent by weight of the mixture, the calcined mixture of oxides constituting between about 2% and about 15% by weight of the catalyst, and said carrier consisting of high grade alumina containing less than 0.05% sodium on a $Na_2O$ basis.

6. A method for the preparation of a supported catalyst which comprises forming a mixture consisting essentially of a major mol amount of a hexavalent chromium compound convertible to trivalent chromium oxide upon calcination in air and a minor mol amount of a nickel compound which yields nickel oxide upon calcination, the amount of said nickel compound being such as to result in a catalyst containing less than 1% nickel by weight, calcining said mixture at a calcination temperature of between about 850° F. and about 1200° F. for sufficient time to convert substantially all of said hexavalent chromium compound to chromic oxide and to reduce the hexavalent chromium content of the mixture to less than 1% by weight of the mixture, cooling the calcined mixture, incorporating the calcined cooled mixture in an inert carrier selected from the group consisting of (1) high-grade, low-sodium alumina and (2) mixtures comprising hydraulic cement and clay, the amount of said calcined mixture so incorporated in said carrier being between about 2% and about 15% by weight of the total amount of said carrier and said calcined mixture, and then forming the resulting mixture of calcined material and carrier into suitable catalyst shapes.

7. The method of claim 6 in which the hexavalent chromium compound is chromic acid anhydride and the duration of the calcination at said calcination temperature is about sixteen hours.

8. The method of claim 6 in which the catalyst shapes are activated for use in catalyzing a selective hydrogenation reaction by contacting them with hydrogen for several hours at a temperature of about 750° F.

9. The method of preparing a supported nickel-chrome selective hydrogenation catalyst comprising calcining a mixture consisting essentially of a minor mol amount of a nickel compound which yields nickel oxide upon calcination, the amount of said nickel compound utilized being such that the the resulting catalyst contains less than 1% nickel by weight, and a major mol amount of hexavalent chromium compound which yields trivalent chromium oxide upon calcination, said calcination being conducted in an oxidizing atmosphere at a temperature in excess of about 850° F. and below about 1200° F. for several hours and thereby producing a partially sintered mixture of nickel and chromium oxides containing less than 1% hexavalent chromium, admixing one part of the thus calcined sintered oxides with about 19 to about 49 parts by weight of a carrier selected from the group consisting of (1) high-grade, low-sodium alumina and (2) mixtures comprising hydraulic cement and clay, and forming the admixed oxides and carrier into suitable catalyst shapes.

References Cited in the file of this patent

UNITED STATES PATENTS

| | | |
|---|---|---|
| 2,038,566 | Huettner | Apr. 28, 1936 |
| 2,408,131 | Voorhies | Sept. 29, 1946 |
| 2,435,551 | Black | Feb. 3, 1948 |
| 2,440,929 | Bremner et al. | May 4, 1948 |
| 2,523,686 | Engel | Sept. 26, 1950 |
| 2,574,355 | Smith | Nov. 6, 1951 |
| 2,658,858 | Lang et al. | Nov. 10, 1953 |
| 2,665,259 | Buffett | Jan. 5, 1954 |
| 2,689,266 | Coonradt et al. | Sept. 14, 1954 |